United States Patent [19]

Nishitani et al.

[11] Patent Number: 4,817,047

[45] Date of Patent: Mar. 28, 1989

[54] PROCESSING CIRCUIT CAPABLE OF RAISING THROUGHPUT OF ACCUMULATION

[75] Inventors: Takao Nishitani; Ichiro Kuroda; Hideo Tanaka; Kyosuke Sugishita, all of Tokyo, Japan

[73] Assignee: NEC Corporation, Tokyo, Japan

[21] Appl. No.: 883,703

[22] Filed: Jul. 9, 1986

[30] Foreign Application Priority Data

Jul. 9, 1985 [JP] Japan ................................. 60-152019

[51] Int. Cl.$^4$ ............................ G06F 7/52; G06F 7/38
[52] U.S. Cl. .................................... 364/754; 364/745; 364/736
[58] Field of Search ....................... 364/754, 757-760, 364/745, 736, 737, 748

[56] References Cited

U.S. PATENT DOCUMENTS

4,075,688  2/1978  Lynch, Jr. et al. ................. 364/736
4,511,990  4/1985  Hagiwara et al. .................. 364/748

FOREIGN PATENT DOCUMENTS

0136834  4/1985  European Pat. Off. ............ 364/736
0161089  11/1985 European Pat. Off. ............ 364/754
60-54070  3/1985  Japan ................................. 364/736
8602181  4/1986  World Int. Prop. O. .......... 364/754

OTHER PUBLICATIONS

P. Chevillat et al., "Pipelined Hardware Multiplier With Extended Precision", IBM Technical Disclosure Bulletin, vol. 23, No. 9, Feb. 1981, pp. 4322-4323.
The Bipolar Digital Integrated Circuits Data Book for Design Engineers 1985, TTL/Interface Circuits, Texas Instruments, 1985, pp. 7-234 to 7-263.
VLSI Data Book, LSI Products Division, TRW Electronic Components Group, 1984, pp. 203-216.
Nishitani et al., "A Single-Chip Digital Signal Processor for Telecommunication Applications", IEEE Journal of Solid-State Circuits, vol. SC-16, No. 4, Aug. 1981, pp. 372-376.
Erskine et al., "Architecture and Applications of a Second-Generation Digital Signal Processor", Proceedings ICASSP 85, IEEE International Conference on Acoustics, Speech, and Signal Processing, vol. 1, 1985, pp. 228-231.
Mick, John R., "Am25S10 Four-Bit Shifter", Schottky and Low-Power Schottky Data Book Including Digital Signal Processing Handbook, Second Edition, Second Printing, Advanced Micro Devices, Jul. 1978, pp. 4-37 to 4-46.

Primary Examiner—Gary V. Harkcom
Assistant Examiner—Long T. Nguyen
Attorney, Agent, or Firm—Foley & Lardner, Schwartz, Jeffery, Schwaab, Mack, Blumenthal & Evans

[57] ABSTRACT

A digital signal processing circuit reduces the occurrence of overflow conditions during successive arithmetic operations. The product output of a multiplication circuit is shifted by a barrel shifter to round off a predetermined number of least significant bits, thereby reducing the occurrence of an overflow condition when the successive product outputs of the multiplication circuit are summed by an arithmetic logic unit (ALU) to produce a summed output. The summed output is then shifted toward the most significant bit by a predetermined number before an output signal is generated. An overflow detection and correction circuit is provided in the event of an overflow condition occurring either to the ALU or the barrel shifter.

6 Claims, 2 Drawing Sheets

PROCESSING CIRCUIT CAPABLE OF RAISING THROUGHPUT OF ACCUMULATION

BACKGROUND OF THE INVENTION

This invention relates to a processing circuit for use in processing digital signals in a signal processor.

In general, digital signal processing can accomplish reliability and stability higher than analog signal processing and realizes a filter and a modem which have high reliability and high stability. In addition, the digital signal processing enables a time-varying adaptive filter which can not be expected in the analog signal processing.

However, the digital signal processing is inferior in a size of hardware and in power consumption to the analog signal processing. Under the circumstances, the digital signal processing has not been put into practical use until recent rapid evolution of a digital large scale integration circuit, namely, the advent of a signal processor for processing digital signals.

Such a signal processor must process arithmetic operation at a high speed because a differential and an integration can be carried out in a digital manner. The signal processor has therefore been developed independently of a general purpose computer and a general purpose microprocessor.

In order to increase throughput of the signal processor by the use of a small amount of hardware, each value or number is frequently represented by two's complement of a binary number and is often expressed by a fixed-point representation. More specifically, the signal processor processes a digital signal which is subjected to analog-to-digital conversion and which is normalized with reference to a maximum acceptable amplitude of an analog-to-digital converter. For this purpose, the maximum acceptable amplitude is represented by 1.0.

In the fixed-point representation, a fixed point is placed between a most significant bit and a most significant bit but one. Each value is handled as numerals falling within a range from $-1$ (inclusive) to $+1$ (exclusive). The range will be called a predetermined dynamic range and specified by $[-1, +1)$. It is mentioned here that the most significant bit serves as a sign bit, as known in the art.

In an article contributed by Takao Nishitani et al to IEEE Journal of Solid State Circuits, Vol. SC-16, No. 4 (August 1981), pages 372 to 376, a signal processor is used to calculate a product of a first input data word and a second input data word. When each of the first and the second input data words has a single precision bit length of N bits given by the fixed-point representation of two's complement, the product can be represented by a double precision bit length of $(2N-1)$ bits. In this event, a fixed point of the product is located between a most significant bit and a most significant bit but one, like each of the first and the second input data words. A more significant half (N bits) of the product is produced as an output signal so as to keep a dynamic range of each signal constant.

In a finite impulse response (FIR) filter, such a signal processor must carry out an arithmetic operation given by:

$$y_j = \sum_{i=1}^{M} a_i \cdot x_{j-i}, \quad (1)$$

where $x_j$ and $y_j$ are representative of input and output signals produced at a time instant j, respectively, and $a_i$, coefficients for deciding a characteristic of the filter. The output signal $y_j$ may be referred to as a sum signal.

In Equation (1), the coefficients $a_i$ are determined so that the output signal $y_j$ averagely falls within the predetermined range of $[-1, +1)$, if the input signal $x_j$ is within the predetermined range. However, the coefficients $a_i$ are not always restricted within the predetermined range of $[-1, +1)$. This means that an intermediate result of calculation of Equation (1) often falls outside of the predetermined range of $[-1, +1)$.

Taking the above into consideration, a conventional method converts the coefficients $a_i$ into the predetermined range of $[-1, +1)$. For this purpose, the respective coefficients $a_i$ are modified into modified coefficients $b_i$ by dividing the coefficients $a_i$ by a number which is greater than a maximum value of absolute values of the coefficients $a_i$ and which is equal to two to a K-th power. More particularly, the modified coefficients $b_i$ are given by:

$$b_i = a_i 2^{-K}. \quad (2)$$

Under the circumstances, Equation (1) is rewritten by the use of Equation (2) into:

$$\begin{aligned} y_j &= \sum_{i=1}^{M} a_i \cdot x_{j-i}, \\ &= 2^K \cdot \sum_{i=1}^{M} (a_i \cdot 2^{-K}) \cdot x_{j-i} \\ &= 2^K \cdot \sum_{i=1}^{M} b_i \cdot x_{j-i}. \end{aligned} \quad (3)$$

From Equation (3), it is readily understood that the output signal $y_j$ can be calculated by accumulating products of $b_i$ and $x_{j-i}$ to obtain a result of accumulation and thereafter by multiplying the result of accumulation by $2^K$. As mentioned before, each of $b_i$ and $x_{j-i}$ falls within the predetermined range of $[-1, +1)$ and the product thereof also falls within the above-mentioned range. However, on calculating a sum of the products, M in number, either an intermediate result or a final result of the calculation might fall outside of the predetermined range of $[-1, +1)$. In other words, an overflow might occur in the course of calculation.

Each time when the overflow occurs in a signal processor comprising a single precision adder, it is usual that a maximum value is substituted for an overflow value by hardware. Alternatively, the overflow is neglected and handled as a calculation noise.

As far as the finite impulse response filter is concerned, such an overflow does not put a system in an unstable state.

However, in a system, such as an infinite impulse response filter, having a feedback loop, occurrence of an overflow gives rise to unstability of the system. Accordingly, replacement of a maximum value should be done on occurrence of the overflow even at the cost of an operation speed.

As mentioned above, conventional methods either neglect an overflow appearing in the course of calculation or replace a maximum value each time when an overflow occurs. The neglection of overflow and frequent replacement of the maximum value result in an undesirable error of the output signal $Y_j$.

In a paper described in PROCEEDINGS ICASSP 85, IEEE INTERNATIONAL CONFERENCE ON ACOUSTICS, SPEECH, AND SIGNAL PROCESSING, VOL. 1, pages 228 to 231, a signal processor is disclosed by Cole Erskine et al. The signal processor is for carrying out calculation of Equation (1) and comprises a multiplier for multiplying a first data word of 16 bits by a second data word of 16 bits to produce a product of 32 bits. Each of the first and the second data words has a single precision bit length while the product has a double precision data length. The product of 32 bits is sent through a shifter to an arithmetic/logic unit to be successively accumulated into a result of accumulation of 32 bits. The result of accumulation is divided into an upper significant half of 16 bits and a lower significant half of 16 bits which are kept in an upper part and a lower part of an accumulator, respectively. The upper and the lower significant halves of the result of accumulation are produced as an accumulator output signal from the accumulator. The accumulator output signal is fed back to the arithmetic/logic unit on one hand and are delivered to a data bus of 16 bits through shifters on the other hand. The shifters serve to adjust the accumulator output signal of 32 bits to the data bus of 16 bits by shifting the accumulator output signal by a single bit or four bits. Such shift operation may be carried out towards a least significant bit of the accumulator output signal and consequently brings about no overflow in the shifters.

At any rate, no consideration is paid to an overflow which may occur in the arithmetic/logic unit.

SUMMARY OF THE INVENTION

It is an object of this invention to provide a processing circuit which can raise throughput on accumulating a predetermined number of products.

It is another object of this invention to provide a processing circuit of the type described, which can raise a precision of calculation by reducing an error included in an output signal.

It is still another object of this invention to provide a processing circuit of the type described which can diminish occurrence of overflows which occur in the course of the above-mentioned accumulation.

It is yet another object of this invention to provide a processing object of the type described, which is applicable to both a finite impulse response filter and an infinite impulse response filter.

A processing circuit to which this invention is applicable comprises multiplication means for successively multiplying a first input data signal by a second input data signal to produce a product signal representative of a result of multiplication and summing means coupled to the multiplication means for successively summing up the product signals a first predetermined number of times to produce a sum signal. Each of the first and the second input data signals is represented by a fixed-point representation of a single precision bit length and arranged from a most significant bit to a least significant bit while each of the product signals is represented by the fixed-point representation of a double precision bit length and arranged from a most significant bit to a least significant bit. The sum signal is represented by the fixed-point representation of the single precision bit length. According to this invention, the summing means comprises selecting means responsive to a selection signal for selecting one of said product signal and said sum signal, shifting means coupled to said selecting means for shifting said each product signal towards the least significant bit of said each product signal by a second predetermined number of bits to produce a succession of shifted product signals each of which has the double precision bit length and for shifting said sum signal towards the most significant bit of said sum signal by a third predetermined number of bits to produce a shifted sum signal. The summing means further comprises accumulating means coupled to said shifting means for accumulating the shifted product signals said first predetermined number of times to produce said sum signal representative of a result of accumulation, said sum signal having the double precision bit length and being arranged from a most significant bit to a least significant bit, overflow monitoring means coupled to said accumulating means and said shifting means for monitoring occurrence of an overflow in said shifted sum signal to process said shifted sum signal and thereby to produce a processed signal which is representative of a result of monitoring and has the double precision bit length, and means for producing said processed signal as said sum signal.

DESCRIPTION OF THE PREFERRED EMBODIMENTS

(Principles of the Invention)

Figure 1:
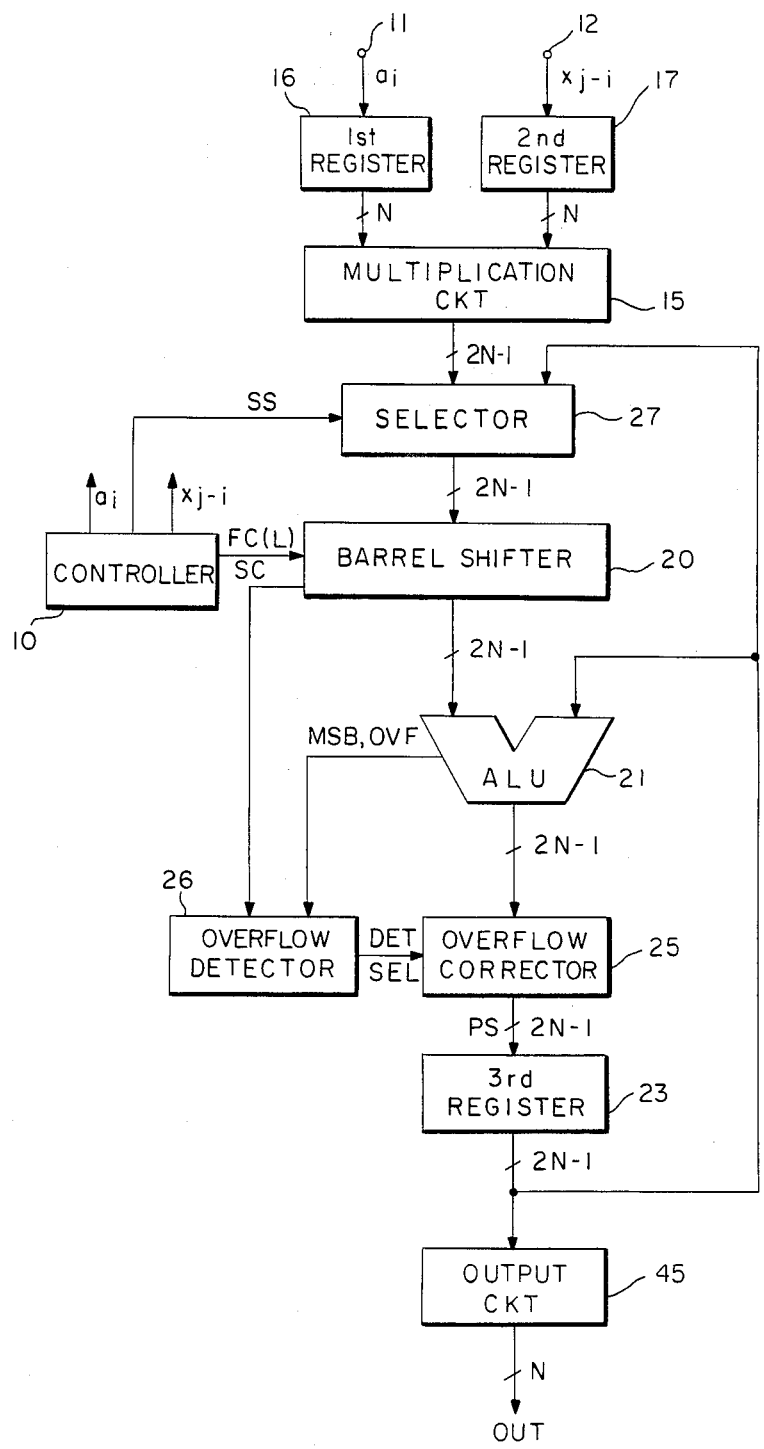
FIG. 1 is a block diagram of a processing circuit according to a first embodiment of this invention.

Description will at first be directed to principles of this invention to facilitate an understanding of this invention.

It is assumed that calculation of Equation (1) is carried out by the use of a fixed-point multiplier responsive to first and second input data signals or words each of which has a single precision bit length of N bits with a most significant bit defined as a sign bit and with a fixed-point placed between the most significant bit and the most significant bit but one. Each input data signal is representative of either a positive number or a negative number represented by two's complement. As well known in the art, the positive number is specified by the sign bit of a logic "0" level while the negative number is specified by the sign bit of a logic "1" level. As a result, each data signal can represent a number falling within a predetermined range of $[-1, +1)$.

The fixed-point multiplier produces a multiplier output signal which is representative of a product of the input data signals and which is represented by a double precision bit length of $(2N-1)$. A fixed-point of the multiplier output signal is placed between a first bit and a second bit following the first bit, like in the input data signals.

Let a first predetermined number of the multiplier output signals be summed up or accumulated in compliance with Equation (1). According to this invention, each of the multiplier output signal is shifted together with the fixed-point towards a least significant bit thereof by a second predetermined number of bits into a shifted multiplier output signal. The second predetermined number is determined in relation to the first predetermined number. The shifted multiplier output signal is represented by a double precision bit length similar to that of the multiplier output signal. Consequently, less significant bits of the multiplier output signal which are equal in number to the second predetermined number are rounded off in the shifted multiplier output signal. Instead, more significant bits of the shifted multiplier output signal are given a logic level identical with that of the sign bit of the multiplier output signal.

It is mentioned here that the shifted multiplier output signal represented in the above-mentioned manner gives rise to no undesired shortage of a precision in relation to the multiplier output signal, although the less significant bits of the multiplier output signal are rounded off in the shifted multiplier output signal. This is because only a single precision bit length of a result of accumulation is produced as an output signal or a sum signal.

In addition, the shift operation towards the least significant bit of the multiplier output signal brings about extension of a variable range, namely, a dynamic range on the above-mentioned accumulation in comparison with the conventional methods which are restricted to the predetermined range.

Inasmuch as the result of accumulation averagely falls within the predetermined range, an accurate value can be obtained by shifting the result of accumulation towards the most significant bit of the result of accumulation by a third predetermined number.

More specifically, each of the first and the second input data signals depicted at $a_i$ and $x_j$ is assumed to be represented by two's complement of N bits. In this case, the first and the second input data signals $a_i$ and $x_j$ are given by:

$$a_i = -a_0^i \cdot 2^K + \sum_{n=1}^{N-1} a_n^i \cdot 2^{K-n} \quad (4)$$

and $$x_j = -x_0^j + \sum_{n=1}^{N-1} x_n^j \cdot 2^{-n},$$

respectively.

As readily understood from Equations (4), the first input data signal $a_i$ falls within a predetermined extent of $[-2^K, 2^K)$ while the second input data signal $x_j$ is within the predetermined range of $[-1, +1)$. The predetermined range of $[-1, +1)$ and the predetermined extent of $[-2^K, 2^K)$ will be referred to hereunder as a first and a second predetermined range, respectively.

Under the circumstances, each product of Equation (1) indicated at $Z_j$ is represented by:

$$Z_i = a_i \cdot x_{j-i} = -Z_0^i \cdot 2^K + \sum_{n=1}^{2N-1} z_n^i \cdot 2^{K-n} \quad (5)$$

Equation (5) shows that each product of the first and the second input data signals falls within the second predetermined range of $[-2^K, 2^K)$ and is represented by $(2N-1)$ bits to be produced as the multiplier output signal.

In Equation (1), accumulation is made about the products which are represented by Equation (5) and which are equal in number to M which may be called a first predetermined number. The accumulation of the products possibly extends the dynamic range of a result of accumulation. A maximum extension of the dynamic range is represented by:

$\log_2 M$ (bits).

A second predetermined number depicted as L is determined in relation to the first predetermined number M by selecting a minimum integer which is equal to or greater than $\log_2 M$. Each product, namely, each multiplier output signal is shifted towards the least significant bit by L bits into the shifted multiplier output signal (depicted at $Z_i^*$) of $(2N-1)$ bits. Each of the more significant bits, L in number, of the shifted multiplier output signal $Z_i^*$ takes the logic level identical with that of the sign bit, namely, the most significant bit $(Z_0^i)$ of the multiplier output signal $Z_i$. Accordingly, the shifted multiplier output signal $Z_i^*$ is given by:

$$Z_i^* = -Z_0^i \cdot 2^{K+L} + \sum_{n=1}^{L-1} Z_0^i, \quad (6)$$

$$2^{K+L-n} + \sum_{n=L}^{2N-1} Z_{n-L+1}^i \cdot 2^{K+L-n+1}$$

As understood from Equation (6), the less significant bits, L in number, of the shifted multiplier output signal $Z_i^*$ are shifted out.

By the use of Equation (6), Equation (1) is rewritten into:

$$y_j = \sum_{i=1}^{M} Z_i^* = -y_0^j \cdot 2^{K+L} + \sum_{n=1}^{2N-1} y_n^j \cdot 2^{K+L-n}. \quad (7)$$

Inasmuch as a result $y_j$ of accumulation averagely resides within the first predetermined range of $[-1, +1)$, as mentioned before, the following relationship holds in many cases:

$$y_0^j = y_1^j = \ldots = y_{K+L}^j \quad (8)$$

Equation (8) shows the fact that a higher significant bits, $(K+L+1)$ in number, of $y_j$ take a common logic level. Accordingly, an identical value can be represented even when $(K+L)$ bits are omitted from the above-mentioned higher significant bits.

Taking the above into account, the result $y_j$ of Equation (7) is shifted into a modified result signal towards the most significant bit thereof by a third predetermined number of bits which is equal to $(K+L)$. If upper significant bits, N in number, are derived from the modified result signal, the upper significant bits may be produced as a circuit output signal having the dynamic range of $[-1, +1)$.

If Equation (8) does not hold, the result $y_j$ of calculation is outside of the first predetermined range of $[-1, +1)$ and is not representative of a correct output signal. In this event, judgement may be made as occurrence of an overflow. On occurrence of the overflow, either a positive or a negative maximum value is substituted for the result $y_j$ of accumulation.

It is readily possible to detect whether or not the overflow occurs in the result $y_j$ of accumulation by monitoring $y_0^j$ of Equation (7) on condition that Equation (8) does not hold. This is because no overflow takes place in $y_j$ of Equation (7) represented by $(2N-1)$ bits. More particularly, if $y_0^j = 0$, the positive maximum value may be substituted for the result $y_j$ of accumulation by judging the overflow as a positive overflow. If $y_0{}^j = 1$, the negative maximum value may be substituted for the result $y_j$ of accumulation by judging the overflow as a negative overflow.

According to the above-mentioned procedure, an error of the output signal results from rounding off the less significant bits, L in number, on rewriting Equation (5) into Equation (6) and from the abovementioned overflow. It is to be noted that round off errors which result from rounding off the less significant bits, L in number, are repeatedly added M times. Such addition of the round off errors, M in number, brings about extension of an error range by $\log_2 M$ (bits), as described in conjunction with Equation (5). Accordingly, the minimum integer L may be selected which is equal to or greater than $\log_2 M$ like in the maximum extension of the dynamic range. As a result, addition of each round off error of L bits influences 2L bits at most.

In addition, upward shift of (K+L) bits is carried out, as described in conjunction with Equation (8) to produce the output signal. Taking the upward shift of (K+L) bits into consideration, the addition of each round off error influences the output signal over bits thereof which are not less than (K+3L) bits.

Moreover, the result $y_j$ of (2N−1) bits are tailored into a circuit output signal of N bits by rounding off the lower significant bits, (N−1) in number, of the circuit output signal. If the round off bit number (N−1) is greater than (K+3L), namely, $$N - 1 \leq K + 3L \tag{9}$$

no substantial influence appears from downward shift of L bits and upward shift of (K+L) bits which are carried out in the course of calculation.

On accumulating the products, M in number, the dynamic range is extended by L bits selected in relation to M so as to cope with a maximum variation of the dynamic range, as mentioned above.

It is mentioned here that each output signal $y_j$ is restricted to the first predetermined range of [−1, +1). Therefore, a dynamic range may be extended by a bit number of L′ which is smaller than L. In this case, an overflow may take place in the course of accumulation. However, a frequency of occurrence of the overflows is considerably reduced in comparison with the conventional methods. Selection of the bit number of L′ brings about improving accuracy of a value calculated by Equation (6) because a round off error can be reduced in comparison with the case of selecting the bit number of L. The result of accumulation therefore can be calculated with a high precision if no overflow occurs in the course of accumulation.

It is preferable that the second predetermined number is varied with reference to the first predetermined number.

(Embodiments)

Referring to FIG. 1, a processing circuit according to a first embodiment of this invention is for use in carrying out calculation of Equation (1) in response to the first and second input data signals which may be made to correspond to $a_i$ and $x_{j-i}$ of Equation (1), respectively, and each of which has the single precision bit length of N bits. In this connection, the first predetermined number is equal to M.

The first and the second input data signal $a_i$ and $x_{j-i}$ are produced by a controller 10 and sent to first and second input terminals 11 and 12 through a data bus (not shown), respectively. Each of the first and the second input data signals $a_i$ and $x_{j-i}$ is given by two's complement and can therefore be represented by Equation (4).

The first and the second input data signals $a_i$ and $x_{j-i}$ are sent to a multiplication circuit or multiplier 15 through first and second registers 16 and 17 each of which has a bit capacity of N bits (See VLSI Data Book, TRW MPY016H, LSI Products Division, TRW Electronics, 1984, for an example of a multiplier that may be employed as multiplier 15). Each of the first and the second registers 16 and 17 may be a register described in "The Bipolar Digital Integrated Circuits Data Books," page 7-234 - page 7, 239 published 1985 by Texas Instruments Incorporated, Tex.

Initially, the processing circuit is put into a reset state and these registers 16 and 17 are at first loaded with $a_i$ and $x_{j-1}$ as the first and the second input data signals $a_i$ and $x_{j-i}$, respectively.

The multiplication circuit 15 produces the multiplier output signal which is given by Equation (5) and which has (2N−1) bits. The multiplier output signal may be called a product signal representative of a result of multiplication and is sent to a selector 27 which is coupled to the controller 10. The selector 27 is also supplied with a 2N−1 bit output of a third register 23 (described later) and selects the multiplier output in response to the logic "1" level of a selection signal SS from the controller 10 until the multiplication result of $Z_M = a_M \cdot x_{j-M}$ is achieved. The selected multiplier output is then sent to a barrel shifter 20 which may be an integrated circuit described in "Schottky and Lowpower Schottky Data Book Including Digital Signal Processing Handbook," pages 4-37 to 4-46, published 1977 by Advanced Micro Devices, Inc., Calif. At any rate, the barrel shifter 20 can shift a loaded bit signal by an optional number of bits externally indicated.

In the example being illustrated, the barrel shifter 20 is supplied from the controller 10 with a first control signal FC representative of the second predetermined number L determined in relation to the first predetermined number M in the above-mentioned manner. Thus, the controller 10 comprises a calculation circuit for calculating the second predetermined number L with reference to the first predetermined number M.

Consequently, the multiplier output signal is shifted by L bits towards the least significant bit thereof or downwards into the shifted multiplier output signal $Z_i^*$ of (2N−1) bits expressed by Equation (6). The signal $Z_i^*$ includes the higher significant bits, (K+L+1) in number, identical with the sign bit.

The shifted multiplier output signals $Z_i^*$ may be called shifted product signals and are sent to an arithmetic/logic unit (ALU) 21 which successively accumulates the signals $Z_i^*$ M times in a manner to be described later. The ALU 21 has a most significant bit terminal and an overflow terminal. The most significant bit terminal is supplied with a most significant bit signal MSB representing a polarity of the most significant bit of the result of accumulation while the overflow terminal is given the logic "1" level as an overflow signal OVF when the overflow takes place in the ALU 21. Such an ALU 21 may be an integrated circuit described in "The Bipolar Digital Integrated Circuits Data Book" (pages 7-252 to 7-262), supra.

At any rate, the ALU 21 produces the result $y_j$ of accumulation.

When the processing circuit is supplied with $a_l$ and $x_{j-1}$, the shifted multiplier output signal $Z_1^*$ passes through the ALU 21 as it stands and is sent as the result of accumulation to the third register 23 of (2N−1) bits through an overflow corrector 25 which will later be described in detail together with an overflow detector 26. As a result, the third register 23 is loaded with the result of accumulation which may now be called a stored or previous result of accumulation. The third register 23 may be similar in structure and operation to each of the first and the second registers 16 and 17. The previous result of accumulation is sent to the ALU 21.

During calculation of a first one ($Z_1^*$) of the shifted multiplier output signal $Z_i^*$, no overflow takes place in the ALU. This is because the ALU 21 carries out addition of 0 to the first shifted multiplier output signal $Z_1^*$. Under the circumstances, the overflow detector 26 can not detect any overflow and sends the overflow corrector 25 a first detection signal representative of detection of absence or no occurrence of any overflow. Responsive to the first detection signal, the overflow corrector 25 allows the first shifted multiplier output signal $Z_1^*$ to pass therethrough, as described above.

Subsequently, the multiplication circuit 15 is supplied with $a_2$ and $x_{j-2}$ as the first and the second input data signals $a_i$ and $x_{j-i}$ through the first and the second registers 16 and 17, respectively. The multiplication circuit 15 supplies the barrel shifter 20 through the selector 27 with $Z_2$ of (2N−1) bits as the multiplier output signal $Z_i$ in the manner represented by Equation (5). The barrel shifter 20 shifts $Z_2$ towards the least significant bit by L bits into a second one ($Z_2^*$) of the shifted multiplier output signal $Z_i^*$.

The second shifted multiplier output signal $Z_2^*$ is added in the ALU 21 to the previous result of accumulation, namely, the first shifted multiplier output signal $Z_1^*$ which is given from the register 23. Inasmuch as each of the second shifted multiplier output signal $Z_2^*$ and the previous result of accumulation is shifted towards the least significant bit by L bits, any overflow does not occur in the ALU 21. Accordingly, the overflow detector 26 supplies the overflow corrector 25 with the first detection signal representative of detection of no overflow. As a result, a sum of the first and the second shifted multiplier output signals $Z_1^*$ and $Z_2^*$ is kept in the third register 23 through the overflow corrector 25 as the previous result of accumulation.

The above-mentioned operation or calculation is repeated M times. In this event, the third register 23 is loaded with the result of accumulation represented by Equation (7) while the shifter 20 and the selector 27 are supplied with the second control signal SC representative of (K+L) and the logic "0" level of the selection signal SS from the controller 10, respectively. Thus, the controller 10 comprises another calculation circuit for producing the second control signal SC with reference to K and L. It is to be noted here that the second control signal SC is produced after the shifted multiplier output signal $Z_i^*$ is added M times.

The selector 27 is responsive to the logic "0" level of the signal SS to select the result of accumulation and send the same to the shifter 20. Responsive to the second control signal SC, the shifter 20 shifts the result of accumulation towards the most significant bit thereof by the third predetermined number (K+L) of bits. For the time being, it is surmised that the first predetermined number M is comparatively small and that the formula (9) holds. The shifted result of accumulation is supplied to the overflow corrector 25 through the ALU 21. Meanwhile, the overflow detector 26 serves to detect whether or not an overflow occurs in the shifter 20 and whether the overflow is a positive or negative overflow.

If the detector 26 detects no overflow in the shifted result of accumulation, the corrector 25 passes the shifted result as a processed signal through the third register 23 to an output circuit 45. In the output circuit 45, the processed signal PS is tailored into a circuit output signal OUT of N bits which is sent to the data bus. The circuit output signal OUT is representative of a final sum and may be called a sum signal.

Figure 2:
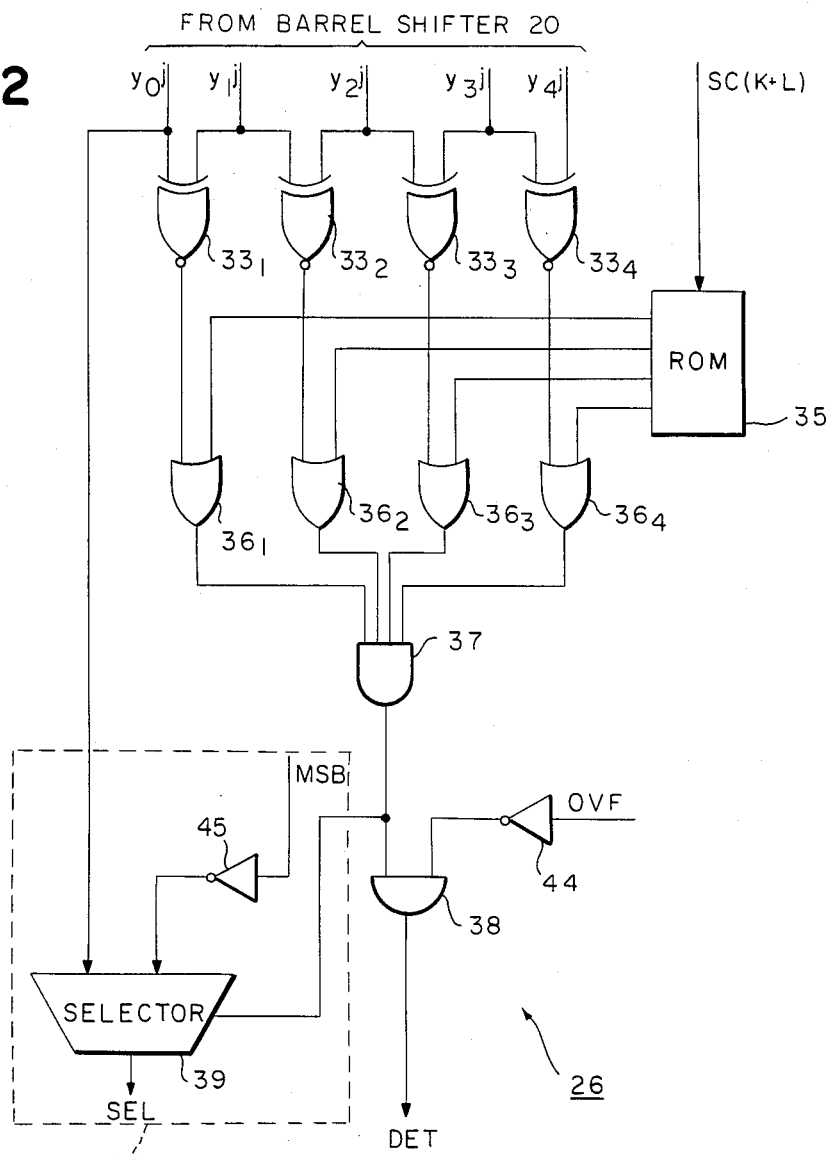
FIG. 2 is a circuit diagram of a part of the processing circuit illustrated in FIG. 1.

FIG. 2 shows one example of the overflow detector 26 which comprises an overflow direction indicating circuit 46 for indicating whether the overflow is positive one or negative one.

It is assumed that the ALU 21 and the shifter 20 are not simultaneously put into overflow states. Occurrence of the overflow in the result $y_j$ of accumulation is detected by monitoring the higher significant bits of the result $y_j$ of accumulation, as mentioned in conjunction with Equation (8). In the example being illustrated, five bits depicted at $y_0^j$ through $y_4^j$ are supplied to first through fourth Exclusive NOR gates $33_1$ to $33_4$ in pairs to detect whether or not two adjacent ones of the five bits $y_0^j$ to $y_4^j$ are coincident with each other.

On the other hand, the second control signal SC is sent from the controller 10 as an address signal to a read-only memory 35 having a plurality of memory addresses each of which stores data signals corresponding to the second control signal SC. As mentioned before, the third predetermined number (K+L) may be variable as the first predetermined number M varies. In the illustrated example, the third predetermined number (K+L) is varied between 0 and 4, both inclusive. Each data signal has a four bit pattern as shown in Table 1.

TABLE 1

| Addresses | Contents |
|---|---|
| 0 | 1 1 1 1 |
| 1 | 0 1 1 1 |
| 2 | 0 0 1 1 |
| 3 | 0 0 0 1 |
| 4 | 0 0 0 0 |

In Table 1, the third predetermined number (K +L) is specified by the number of the logic "0" levels arranged from the most significant bit of each four bit pattern. Operation for indicating the overflow is carried out at each bit position of the logic "0" level, as will later become clear as the description proceeds.

Let the third predetermined number (K+L) be equal to 2. In other words, it is assumed that upward shift operation of two bits is indicated by the second control signal SC. In addition, the five higher significant bits $y_0^j$ to $y_4^j$ are assumed to take a five bit pattern of (1, 1, 1, 0, 1). Responsive to the five bit pattern of (1, 1, 1, 0, 1), the Exclusive NOR gates $33_1$ to $33_4$ produce gate signals of (1, 1, 0, 0) which are supplied to OR gates $36_1$ to $36_4$, respectively. Inasmuch as the read-only memory 35 supplies the OR gates $36_1$ to $36_4$ with the four bit pattern of (0, 0, 1, 1) in response to the second control signal SC indicative of the two bit shift operation, the OR gates $36_1$ to $36_4$ supply (1, 1, 1, 1) to an AND gate 37, respectively.

As a result, the AND gate 37 produces a logic "1" level signal representative of absence or nonoccurrence of any overflow. It is understood that the AND gate 37 practically monitors signals produced by the Exclusive NOR gates $33_1$ and $33_2$ when the two bit shift operation is indicated by the controller 10. Consequently, the AND gate 37 indicates coincidence of three bits $y_0{}^j$, $y_1{}^j$ and $y_2{}^j$, namely, nonoccurrence of any overflow when the logic "1" level signal is produced by the AND gate 37.

In FIG. 2, the overflow detector 26 is supplied with the most significant bit signal MSB and the overflow signal OVF from the ALU 21. The overflow signal OVF is sent through an inverter 44 to an AND circuit 38 while the most significant bit signal MSB is sent through another inverter 45 to a selector 39 which is connected to the AND gate 37 and which is responsive to the sign bit $y_0{}^j$ of the result $y_j$ of accumulation. In addition, the AND gate 37 is connected to the AND circuit 38. It is to be noted that a combination of the inverter 45 and the selector 39 form the overflow direction indicating circuit 46.

As mentioned before, the overflow signal OVF takes the logic "0" level when no overflow occurs in the ALU 21. The AND circuit 38 produces the logic "1" level as a detector output signal DET when no overflow is indicated by the logic "1" level of the AND gate 37 and the logic "0" level of the overflow signal OVF.

Supplied with the logic "1" level from the AND gate 37, the selector 39 selects an output of the inverter 45 as a selector output signal SEL. Such an inverter output signal may be called an inverted most significant bit signal $\overline{MSB}$ and is selected when no overflow occurs at least in the shifter 20.

The selected $\overline{MSB}$ also shows a polarity of the overflow in the ALU 21, when the overflow occurs in the ALU 21. This is because the most significant bit o sign bit of the ALU 21 is inverted on occurrence of the overflow in the ALU 21, as known in the art.

In short, the selector 39 produces a selector output signal SEL representative of the polarity of an overflow which may occur in either the shifter 20 or the ALU 21. The selector output signal SEL takes the logic "1" level when the overflow is a negative one. Otherwise, the selector output signal SEL takes the logic "0" level. Thus, the selector output signal SEL may be referred to as an overflow polarity signal.

In the above-mentioned example, the detector output signal DET takes the logic "1" level with the inverter output signal selected by the selector 39. Therefore, the overflow detector 26 informs the overflow corrector 25 (FIG. 1) of no occurrence of overflow in both the shifter 20 and the ALU 21.

In FIG. 2, let the five higher significant bits $y_0{}^j$ to $y_4{}^j$ take the five bit pattern of (1, 1, 0, 0, 1) with the two bit shift operation indicated by the controller 10. In this case, the Exclusive NOR gates $33_1$ to $33_4$ produce the gate output signal of (1, 0, 1, 0), respectively. Consequently, the OR gates $36_1$ to $36_4$ send the AND gate 37 the four bit pattern of (1, 0, 1, 1). The AND gate 37 therefore produces the logic "0" level representative of occurrence of the overflow in the shifter 20. The logic "0" level signal is sent to the AND circuit 38 to render the detector output signal DET into the logic "0" level on one hand and is supplied to the selector 39, to make the same select the sign bit $y_0{}^j$ of the result $y_j$ of accumulation. Inasmuch as the sign bit $y_0{}^j$ takes the logic "1" level, the selector output signal SEL is indicative of occurrence of the negative overflow.

Similar operation is carried out on occurrence of the positive overflow. Thus, the overflow detector 26 indicates occurrence of the overflow in either the shifter 20 or the ALU 21 and the polarity of the overflow.

Figure 3:
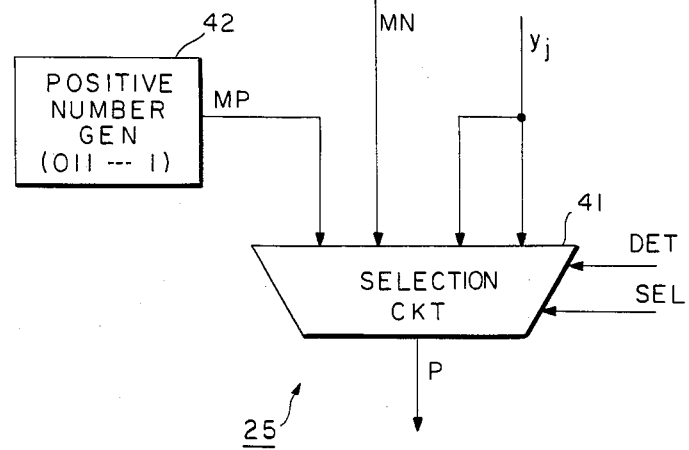
FIG. 3 is a block diagram of another part of the processing circuit illustrated in FIG. 1.

Referring to FIG. 1 again and FIG. 3 afresh, the overflow corrector 25 comprises a selection circuit 41 controlled by the detector output signal DET and the selector output signal SEL both of which are described with reference to FIG. 2. In addition, the selection circuit 41 is connected to the ALU 21, a positive number generator 42, and a negative number generator 43. The positive number generator 42 is for generating a positive maximum number MP equal to 011 . . . 1 while the negative number generator 43 is for generating a negative maximum number MN of 100 . . . 0. Either one of the result $y_j$ of accumulation, the positive maximum number, and the negative maximum number is selected by the selection circuit 41 in response to the detector output signal DET and the selector output signal SEL and is produced as the processed signal PS in accordance with Table 2.

TABLE 2

| DET | | SEL | | PS |
|---|---|---|---|---|
| 0 | (OCCURRENCE OF OVERFLOW) | 0 | (POSITIVE OVERFLOW) | 011 . . . 1 |
| 0 | (OCCURRENCE OF OVERFLOW) | 1 | (NEGATIVE OVERFLOW) | 100 . . . 0 |
| 1 | (NO OCCURRENCE OF OVERFLOW) | 0 | | $y_j$ |
| 1 | (NO OCCURENCE OF OVERFLOW) | 1 | | $y_j$ |

As readily understood from Table 2, the positive maximum number MP is selected as the processed signal PS by the selection circuit 41 on occurrence of the positive overflow while the negative maximum number MW is selected on occurrence of the negative overflow. On no occurrence of any overflow, the result $y_j$ of accumulation is produced as the processed signal PS.

A combination of the overflow detector 26 and the overflow corrector 25 serves to monitor an overflow in the shifter 20 and the ALU 21 to produce the processed signal PS. In addition, the positive or the negative maximum number MP or MN is selectively substituted by the selection circuit 41 for the result $y_j$ of accumulation. The selection circuit 41 may be referred to as a substitution circuit.

In the above-mentioned example, it has been assumed that Equation (9) holds because the first predetermined number M is comparatively small. The following description will be directed for a while to the case where Equation (9) does not hold. In this case, the second predetermined number is given by a number L' such that Equation (9) holds. Therefore, the number L' is smaller than L and may be called an additional number. Selection of such an additional number L' might result in possibility of occurrence of an overflow which appears in the course of calculation. However, the calculation can be carried out with a high precision because a smaller number L' determines the downward shift bits.

Let the additional number L' be equal to $\log_2 P$ and an overflow occur in the ALU 21 on a P-th accumulation. The third register 23 is loaded with a result of first through (P−1)-th accumulations, namely, $$\sum_{i=1}^{P-1} a_i x_{j-i}.$$

Under the circumstances, $a_p$ and $x_{j-p}$ are loaded as the first and the second input data signals with the first and the second registers 16 and 17, respectively, on the P-th accumulation. The multiplication circuit 15 produces the multiplier output signal represented by $a_p x_{j-p}$. The multiplier output signal $a_p x_{j-p}$ is shifted downwards by the barrel shifter 20 by L' bits to be added to the abovementioned result of accumulations, namely, to carry out the P-th accumulation.

When the overflow occurs on the P-th accumulation and is a positive one, the ALU 21 indicates a negative number with the most significant bit MSB which is changed to the logic "1" level due to the overflow. The overflow detector 26 detects occurrence of the positive overflow in the above-mentioned manner. As a result, the positive maximum number MP is selected by the overflow corrector 25 in the manner described with reference to FIG. 3 and is substituted for the result of the first through P-th accumulations stored in the third register 23.

After an M-th accumulation, the second control signal SC is given to the shifter 20 to shift the result of accumulation stored in the third register 23 upwards by (K+L') bits.

From the above, it is readily understood that the AND circuit 38 and the selector 39 may be omitted from FIG. 2, if no overflow occurs in the ALU 21 by selection of the number L.

While this invention thus far been described in conjunction with a few embodiments thereof, it will readily be possible for those skilled in the art to put this invention into various other manners. For example, the third predetermined number (K+L) may be changed on each accumulation under control of the controller 10 in FIG. 2. The first and the second input data signals $a_i$ and $x_{j-i}$ may have different bit lengths.

What is claimed is:

1. A processing circuit comprising: multiplication means for successively multiplying a first input data signal by a second input data signal to produce product signals, each product signal being representative of a result of said successive multiplication, each of said first and second input data signals being represented by a fixed-point representation of a single precision bit length and arranged from a most significant bit to a least significant bit and summing means coupled to said multiplication means for successively summing up said product signals a first predetermined number of times to produce an accumulation signal, each of said product signals is represented by the fixed-point representation of a double precision bit length and arranged from a most significant bit to a least significant bit, said summing means comprising:

selecting means responsive to a selection signal for selecting one of said product signals and said accumulation signal;

shifting means coupled to said selecting means for shifting said product signals towards the least significant bit of said product signals by a second predetermined number of bits to produce a succession of shifted product signals each of which has the double precision bit length and for shifting said accumulation signal towards the most significant bit of said accumulation signal by a third predetermined number of bits to produce a shifted accumulation signal;

accumulating means coupled to said shifting means for successively accumulating said first predetermined number of times the shifted product signals to produce said accumulation signal representative of a result of accumulation, said accumulation signal having the double precision bit length and being arranged from a most significant bit to a least significant bit;

overflow monitoring means coupled to said accumulating means and said shifting means for monitoring an occurrence of an overflow in said shifted accumulation signal to process said shifted accumulation signal and thereby to produce a processed signal which is representative of a result of monitoring and has the double precision bit length; and output means for producing a sum signal as an output of said processing circuit based on said processed signal, said sum signal being represented by the fixed-point representation of the single precision bit length.

2. A processing circuit as claimed in claim 1, wherein said overflow monitoring means comprises:

overflow detecting means coupled to said shifting means for detecting occurrence of said overflow in said shifted accumulation signal to produce an overflow signal on the occurrence of said overflow; and substituting means coupled to said overflow detecting means for substituting a preselected signal for said shifted accumulation signal to produce said preselected signal as said processed signal when said overflow signal is received by said overflow detecting means and for producing said shifted accumulation signal as said processed signal when said overflow signal is not received.

3. A processing circuit as claimed in claim 1, wherein said second predetermined number is a minimum integer L which is not smaller than:

$$\log_2 M$$

where M represents said first predetermined number.

4. A processing circuit as claimed in claim 3, wherein one of said first and said second input data signals represents a first value which is not smaller than $-2^K$ and is smaller than $2^K$, where K is a natural number, while the other of said first and said second input data signals stands for a second value which is not smaller than $-1$ and is smaller than $+1$, and said third predetermined number is equal to:

$$K+L.$$

5. A processing circuit as claimed in claim 1, wherein said second predetermined number is an integer L' which is smaller than a minimum integer L which is not smaller than:
$$\log_2 M,$$

where M represents said first predetermined number.

6. A processing circuit as claimed in claim 5, wherein one of said first and said second input data signals represents a first value which is not smaller than $-2^k$ and is smaller than $2^k$, where K is a natural number, while the other of said first and said second input data signals stands for a second value which is not smaller than $-1$ and is smaller than $+1$, and said third predetermined number is equal to:

$$K+L'.$$

* * * * *